United States Patent
Ernis et al.

(10) Patent No.: US 8,616,495 B2
(45) Date of Patent: Dec. 31, 2013

(54) HYDRAULIC CIRCUIT FOR ACTUATING AN UNDERCARRIAGE, AND METHODS OF DEPLOYING AND RAISING AN UNDERCARRIAGE USING SUCH A CIRCUIT

(75) Inventors: Sébastien Ernis, Chatenay Malabry (FR); Xavier Jubert, Boulogne Billancourt (FR); David Leutard, Chatillon (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 128 days.

(21) Appl. No.: 13/273,607

(22) Filed: Oct. 14, 2011

(65) Prior Publication Data

US 2012/0097792 A1    Apr. 26, 2012

(30) Foreign Application Priority Data

Oct. 20, 2010 (FR) ...................................... 10 58581

(51) Int. Cl.
   *B64C 25/52* (2006.01)
(52) U.S. Cl.
   USPC .................................. 244/100 R; 244/102 R
(58) Field of Classification Search
   USPC ............... 244/104 FP, 100 FP, 102 R, 100 R, 244/102 SS, 103 R, 81; 60/484; 29/888.02
   See application file for complete search history.

(56) References Cited

U.S. PATENT DOCUMENTS

| | | | | | |
|---|---|---|---|---|---|
| 2,221,979 | A | * | 11/1940 | Levy | 92/26 |
| 2,701,695 | A | * | 2/1955 | Irwin | 244/102 R |
| 3,107,886 | A | * | 10/1963 | Bossler, Jr. | 244/102 R |
| 3,605,568 | A | * | 9/1971 | Nepp | 92/24 |
| 3,669,387 | A | * | 6/1972 | Lucien | 244/102 SL |
| 4,573,649 | A | * | 3/1986 | Yourkowski et al. | 244/102 R |
| 5,613,651 | A | * | 3/1997 | Meneghetti | 244/50 |
| 7,093,795 | B2 | * | 8/2006 | Lindahl et al. | 244/102 R |
| 7,810,755 | B2 | * | 10/2010 | Reynes | 244/104 FP |
| 2005/0082427 | A1 | * | 4/2005 | Seung | 244/102 R |
| 2008/0087765 | A1 | * | 4/2008 | Leutard et al. | 244/102 R |
| 2008/0277525 | A1 | * | 11/2008 | Reynes | 244/102 R |

FOREIGN PATENT DOCUMENTS

DE            740329 C    10/1943

* cited by examiner

*Primary Examiner* — Christopher P Ellis
*Assistant Examiner* — Medhat Badawi
(74) *Attorney, Agent, or Firm* — Sughrue Mion, PLLC

(57) ABSTRACT

A hydraulic circuit for actuating an undercarriage, the circuit comprising: a feed line for feeding fluid and a return line; at least one door selector connected to the feed and return lines, the selector feeding door service lines, including an opening line and a closing line for opening and closing the doors; at least one undercarriage selector connected to the feed and return lines, feeding undercarriage service lines including a deployment line and a raising line for deploying and raising the undercarriage; and a door unhooking line and an undercarriage unhooking line. The door unhooking line is connected to at least one undercarriage service line while the undercarriage unhooking line is connected to at least one door service line, the circuit also including means for connecting the door service lines together during a door opening stage, and means for connecting the undercarriage service lines together during an undercarriage deployment stage.

6 Claims, 3 Drawing Sheets

HYDRAULIC CIRCUIT FOR ACTUATING AN UNDERCARRIAGE, AND METHODS OF DEPLOYING AND RAISING AN UNDERCARRIAGE USING SUCH A CIRCUIT

BACKGROUND OF THE INVENTION

The invention relates to the field of undercarriages, and more particularly to the hydraulic circuit for actuating undercarriages.

The undercarriages of aircraft are generally retractable, and for this purpose they include actuators that control the deployment and the raising of undercarriages as well as the opening and the closing of the doors of bays for receiving undercarriages in the raised position.

The prior art is described herein with reference to FIG. 1, which is a diagram of an aircraft undercarriage. The undercarriage 1 comprises a leg 2 hinged to the aircraft about an axis 8 and shown here in the deployed position. A double-acting undercarriage actuator 5 having a main chamber and an annular chamber is coupled to the leg 2 to operate the undercarriage 1 between a raised position and a deployed position. The undercarriage 1 is suitable for entering into a bay that is closed by hinged doors 3a and 3b, each fitted with a double-acting door actuator 4a/4b serving to open and close the doors 3a and 3b. An undercarriage uplock box 6 serves to lock the undercarriage 1 in the raised position, and a door uplock box 7 serves to lock the doors in the closed position. The uplock boxes 6 and 7 carry hooks that are mounted to move between an unhooked position that is stable and a hooked position that is likewise stable. The undercarriage 1 and the doors 3a and 3b include respective rollers that, on being raised or closed, serve to co-operate with the corresponding hooks in order to push the hooks towards the stable hooking positions in which the rollers are held captive by the hooks. The uplock boxes 6 and 7 are fitted with single-acting actuators that, on being actuated, cause the hooks to go from the hooking position to the unhooking position, thereby releasing the corresponding element.

With reference now to FIG. 2 that shows a prior art hydraulic circuit for actuating undercarriages, the door actuators 4a and 4b and the undercarriage actuator 5, together with the actuators of the uplock boxes 6 and 7 are powered by a hydraulic circuit that comprises:

a feed line 10 for feeding hydraulic fluid under pressure;
a hydraulic fluid return line 11.
a first service line 21 of the door selector 14, referred to as the opening line 21, that feeds the main chambers of the door actuators 4a and 4b and allows them to be extended, and thus the doors to be opened;
a second service line 22 of the door selector 14, referred to as the closure line 22, that feeds the annular chambers of the door actuators 4a and 4b and enables them to be retracted, and thus the doors to be closed;
a door selector 14 that enables the door service lines 21 and 22 at the outlet from said selector to be selectively connected to the feed line 10 or to the return line 11;
a first service line 25 of the undercarriage selector 15 referred to as the deployment line 25 that feeds the main chamber of the undercarriage actuator 5 and enables it to be extended, and thus enables the undercarriage to be deployed;
a second service line 26 of the undercarriage selector 15 referred to as the raising line 26 that feeds the annular chamber of the undercarriage 5 and that enables it to be retracted, and thus enables the undercarriage to be raised; and
an undercarriage selector 15 enabling the undercarriage service lines 25 and 26 at the outlet of said selector to be connected selectively to the feed line 10 or to the return line 11.

The hydraulic circuit also includes a control member 9 that controls the door and undercarriage selectors 14 and 15. The control member 9 receives instructions to raise or to deploy the undercarriages and forwards the appropriate commands to the selectors. The control member 9 controls the deployment and raising sequences and it may also take account of information coming from sensors.

The door selector 14 comprises a movable slide that can take up three positions 14a, 14b, and 14c in which the position 14b is stable while the extreme positions 14a and 14c are reached only if the control member 9 issues a corresponding order:

in position 14a, the selector 14 feeds pressure to the closure line 22 that is connected to the annular chamber of each door actuator 4a, 4b, thereby enabling said actuators to retract and causing the doors 3a and 3b to close, while the other line is connected to the return;
in position 14b, the selector 14 connects both door service lines to the return; and
in position 14c, the selector 14 feeds pressure to the opening line 21 connected to the main chamber of each door actuator 4a and 4b, enabling said actuators to be extended and causing the doors 3a and 3b to be opened, the other line being connected to the return.

The undercarriage selector 15 is identical to the door selector 14 and comprises a movable slide that can take up three positions 15a, 15b, and 15c, serving respectively to retract, to connect to the return, and to extend the undercarriage actuator 5.

The hydraulic circuit shown in FIG. 2 also has a door unhooking line 23 feeding the actuator of the door uplock box 7. The door unhooking line 23 is connected to the door opening line 21 such that causing the doors 3a and 3b to open also causes power to be fed to the actuator of the door uplock box 7. Thus, the selector 14 can cause the doors 3a and 3b to be opened while simultaneously causing them to be unhooked.

In similar manner, an undercarriage unhooking line 27 feeds the actuator of the undercarriage uplock box 6 and is connected to the undercarriage deployment line 25. Causing the undercarriage 1 to deploy also causes the actuator of the undercarriage uplock box 6 to be powered and thus causes the undercarriage 1 to be unhooked. The selector 15 can cause the undercarriage 1 to be deployed while simultaneously causing it to be unhooked.

The prior art hydraulic circuit is used in application of the raising and deployment sequences as described below.

The undercarriage deployment sequence comprises the steps of:

opening the doors, thereby causing them to be unhooked;
deploying the undercarriage, thereby causing it to be unhooked; and
closing the doors, thereby causing them to be hooked automatically.

The undercarriage raising sequence thus comprises by symmetry the steps of:

opening the doors, thereby causing them to be unhooked;
raising the undercarriage, thereby causing it to be hooked automatically; and
closing the doors, thereby causing them to be hooked automatically.

Causing the doors 3a and 3b to be unhooked simultaneously with them being opened nevertheless gives rise to certain difficulties. Opening the doors while they are still hooked leads to a large force being applied to the hook. The hook must therefore be capable of withstanding this force and the actuator of the door uplock box 7 must be capable of going from the hooked position to the unhooked position in spite of the doors pressing against the hooks.

The same difficulties appear when deploying the undercarriage.

OBJECT OF THE INVENTION

The invention seeks to propose a hydraulic circuit for actuating an undercarriage that remedies these difficulties, at least in part.

BRIEF DESCRIPTION OF THE INVENTION

In order to achieve this object, the invention provides a hydraulic circuit for actuating an undercarriage, the circuit comprising:
- a fluid feed line and a return line;
- at least one door selector connected to the feed and return lines, the selector feeding door service lines, including an opening line and a closing line for opening and closing the doors;
- at least one undercarriage selector connected to the feed and return lines, the selector feeding undercarriage service lines including a deployment line and a raising line for deploying and raising the undercarriage; and
- a door unhooking line and an undercarriage unhooking line.

According to the invention, the door unhooking line is connected to at least one undercarriage service line while the undercarriage unhooking line is connected to at least one door service line, the circuit also including means for connecting the door service lines together during a door opening stage, and means for connecting the undercarriage service lines together during an undercarriage deployment stage.

Thus, by means of the circuit of the invention, and by implementing an appropriate sequence, it is possible to off-load the uplock boxes before commanding them to release.

BRIEF DESCRIPTION OF THE DRAWINGS

The invention can better understood in the light of the description and with reference to the accompanying figures given by way of example and in which, other than FIGS. 1 and 2 as described above and relating to the prior art.

DETAILED DESCRIPTION OF THE INVENTION

Figure 1:
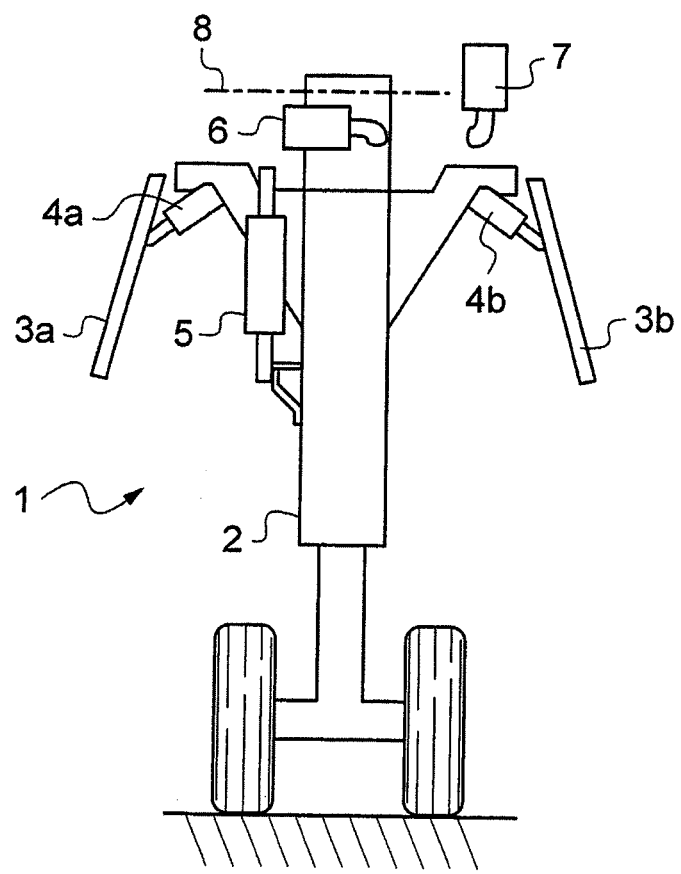
Figure 2:
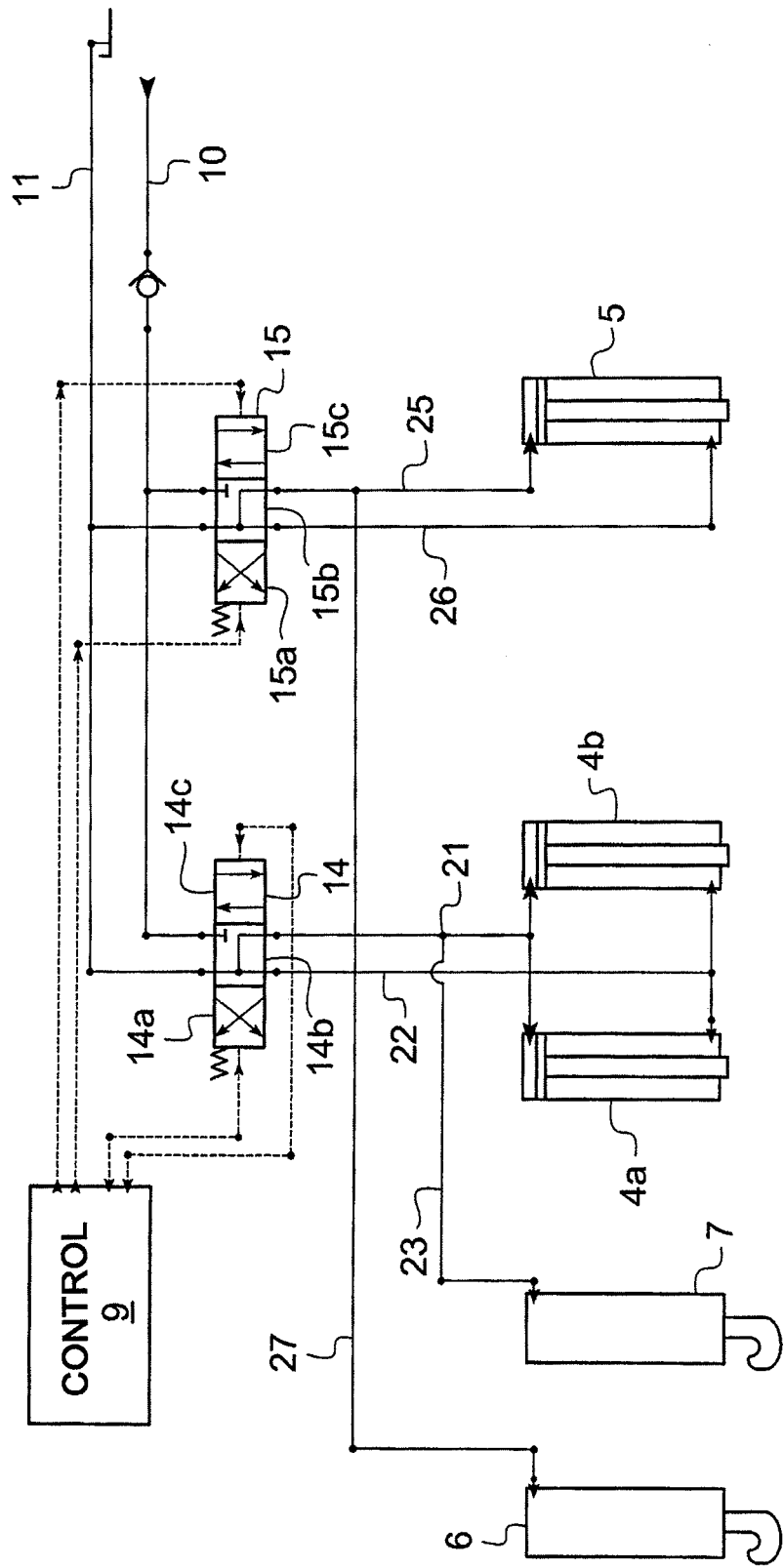
Figure 3:
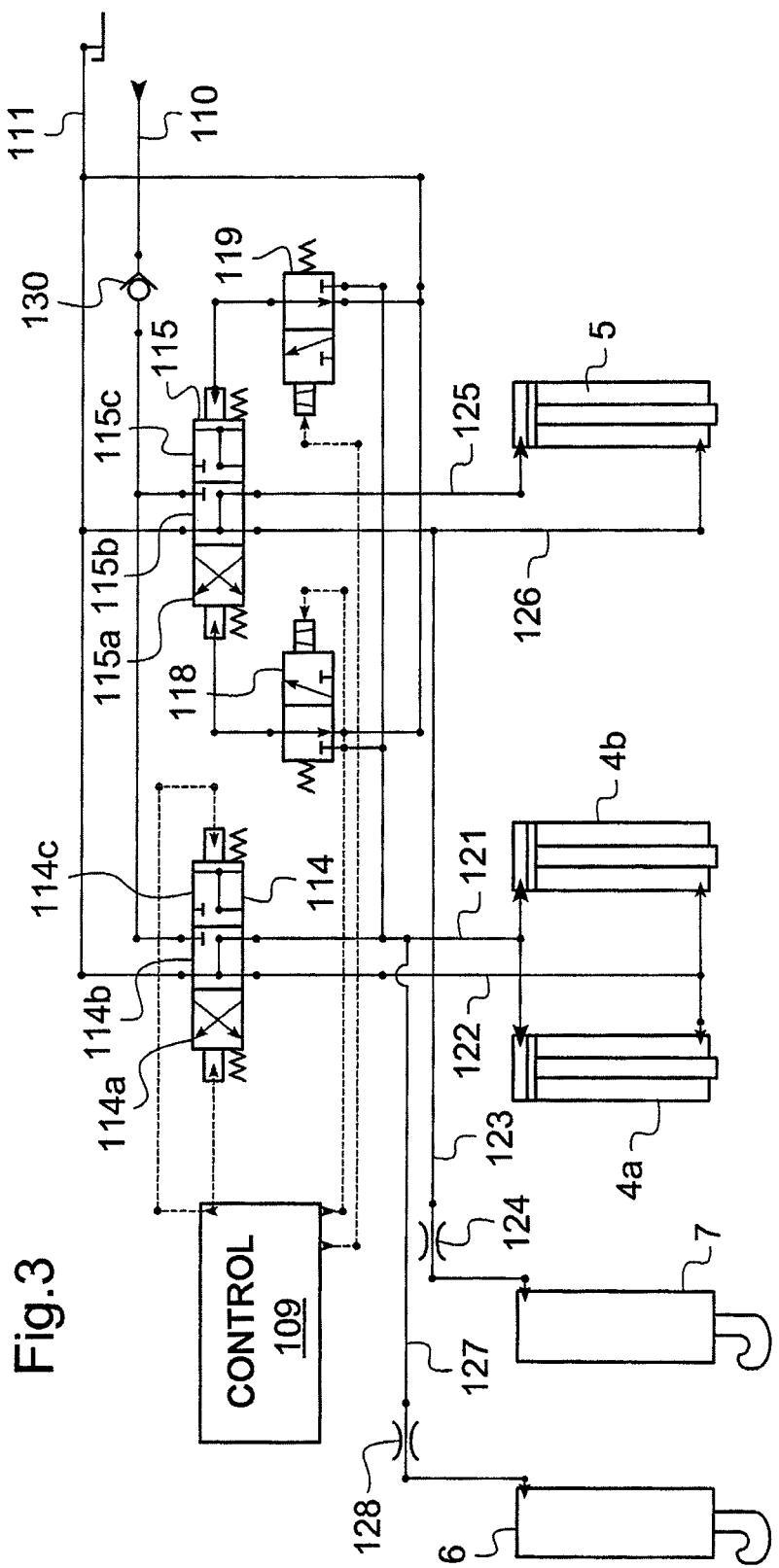
FIG. 3 shows a hydraulic circuit for controlling an undercarriage in a particular embodiment of the invention.

The hydraulic circuit of the invention as shown in FIG. 3 comprises the same elements as the prior art hydraulic circuit. Elements in FIG. 3 that are described above with reference to FIG. 2 are designated by the same references plus 100. For example, the feed line 10 of FIG. 2 becomes the feed line 110 of FIG. 3. The hydraulic circuit of the invention thus comprises:
- a feed line 110 for feeding hydraulic fluid under pressure;
- a hydraulic fluid return line 111;
- a door selector 114 feeding:
  - a door opening line 121; and
  - a door closing line 122;
- an undercarriage selector 115 feeding:
  - an undercarriage deployment line 125; and
  - an undercarriage raising line 126; and unhooking lines 123 and 127 respectively for unhooking the doors and the undercarriage.

The hydraulic circuit also has a control member 109 that controls the various positions of the selectors.

Unlike the prior art shown in FIG. 2, the door unhooking line 123 in accordance with the invention is connected to the undercarriage raising line 126, while the undercarriage unhooking line 127 in accordance with the invention is connected to the door opening line 121. The unhooking lines are thus cross-connected.

Furthermore, the selectors 114 and 115 in the invention are modified so as to put both service lines connected to the same selector into communication with the feed line in the positions 114c and 115c. When the undercarriage selector 115 is in position 115c, the deployment and raising lines 125 and 126 are thus powered simultaneously and the actuator 5 operates in differential mode. In this mode of operation, simultaneously feeding the main and annular chambers with the same pressure causes the actuator to extend. Operating the undercarriage actuator 5 in differential mode reduces the force that the actuator exerts, but that is not troublesome insofar as the actuator is naturally caused to deploy under the effect of its own weight. The role of the undercarriage actuator 5 while deploying the undercarriage 1 is thus merely to overcome any mechanical and aerodynamic resistance. The same applies to the doors.

The door unhooking line 123 and the undercarriage unhooking line 127 have respective constrictions 124 and 128. These constrictions act as delays and they retard actuation of the uplock boxes 6 and 7 relative to the door and undercarriage actuators. Thus, when the raising line 122 is powered by the feed line 110, the doors 3a and 3b are caused to unhook, but after a delay.

Finally, in a particular arrangement that improves overall safety, the undercarriage selector 115 is no longer controlled directly by the control member 109, but instead via two pilot valves 118 and 119. These valves are of the type having one outlet and two inlets (one feed and one return), and also having two positions. The feed line for the valve 118 and 119 is connected directly to the door opening line 121 such that the undercarriage 1 cannot be operated unless the doors 3a and 3b are caused to open. This arrangement ensures that in the event of a malfunction of the control member 9, the undercarriage is not operated unless the doors 3a and 3b have been operated to open.

The undercarriage raising sequence is as follows.

Starting from a position in which the undercarriage 1 is deployed, the doors 3a and 3b are closed and hooked, and the door and undercarriage selectors 114 and 115 being in their neutral positions, the raising sequence of the invention comprises the following steps:

a) controlling the door selector 114 to confirm closure of the doors 3a and 3b by bringing the door selector 114 into position 114a, thereby off-loading the door hook;

b) controlling the undercarriage selector 115 to confirm deployment of the undercarriage 1 by bringing the undercarriage selector 115 into position 115c, thereby enabling the doors to be unhooked;

c) controlling the door selector 114 to cause the doors 3a and 3b to open by bringing the door selector 114 into position 114c;

d) controlling the undercarriage selector 115 to cause the undercarriage 1 to be raised by bringing the undercarriage selector 115 into position 115a until the undercarriage is hooked;

e) neutralizing the undercarriage selector 115 by allowing it to return to position 115b;

f) controlling the door selector 114 to cause the doors 3a and 3b to close by bringing the door selector 114 into position 114a until the doors are hooked; and g) neutralizing the door selector 114 by allowing it to return to position 114b.

The sequence for deploying the undercarriage is as follows.

Starting from a position in which the undercarriage is in its raised position and hooked, with the doors 3a and 3b being closed and hooked, and the door and undercarriage selectors 114 and 115 being in the neutral position, the deployment sequence of the invention comprises the steps of:

a) controlling the door selector 114 to confirm closure of the doors 3a and 3b by bringing the door selector 114 into position 114a, thereby off-loading the door hook;

b) controlling the undercarriage selector 115 to confirm that the undercarriage 1 is raised by bringing the undercarriage selector 115 into position 115a, thereby off-loading the undercarriage hook and also causing the doors to be unhooked;

c) controlling the door selector 114 to cause the doors 3a and 3b to open by bringing the door selector 114 into position 114c, thereby causing the undercarriage to be unhooked, this position continuing until the doors are fully open;

d) controlling the undercarriage selector 115 to cause the undercarriage 1 to be deployed by bringing the undercarriage selector 115 into position 115c;

e) neutralizing the undercarriage selector 115 by allowing it to return to position 115b;

f) controlling the door selector 114 to cause the doors 3a and 3b to close by bringing the door selector 114 into position 114a, with this position being retained until the doors are hooked; and g) neutralizing the door selector 114 by allowing it to return to position 114b.

To guarantee that movements are performed safely, it is appropriate for the movements of the various actuators to be performed in succession. For example, it is appropriate to ensure that the doors are open before deploying or raising the undercarriage. For this purpose, the aircraft and the undercarriage include position sensors for detecting the presence of the undercarriage and/or of the doors in the various positions. The information collected in this way is forwarded to the control member 9 where it is used for controlling the transition from one step to another during the raising and the deployment sequences.

In a particular aspect of the invention, the feed line 110 includes a check valve 130 preventing the fluid contained in the feed line 110 and the service line from returning along the feed line 110. The check valve 130 thus prevents the actuators from retracting under the effect of external forces. During deployment of the undercarriage or opening of the doors, the door actuators 4a and 4b and the undercarriage actuator 5 are then prevented from reversing under the effect of aerodynamic forces acting on the undercarriage 1 or on the doors 3a and 3b.

The invention is naturally not limited to the embodiment described above. In particular, the above-described selectors could be replaced by other members having the same function such as independent solenoid valves arranged in parallel and acting in similar manner to the selectors.

The constrictions 124 and 128 act as time delays between different actuators connected to a common service line. Other devices performing the same delay function could be used, and in particular timed valves that enable the flow of fluid in the lines 123 and 127 for unhooking the doors and the undercarriage to be delayed.

The hydraulic circuit shown in FIG. 3 is for operating an undercarriage 1 and two doors 3a and 3b. The circuit could also be used for controlling a plurality of undercarriages and doors simultaneously, by making branch connections to the service lines. Alternatively, provision could be made to use as many selectors as there are undercarriage and door actuators to be controlled.

The circuit of the invention may also be duplicated identically within the aircraft in order to control as many undercarriages and doors as required.

What is claimed is:

1. A hydraulic circuit for actuating an undercarriage, the circuit comprising:
   a fluid feed line and a return line;
   at least one door selector connected to the feed and return lines, the selector feeding door service lines, including an opening line and a closing line for opening and closing the doors;
   at least one undercarriage selector connected to the feed and return lines, the selector feeding undercarriage service lines including a deployment line and a raising line for deploying and raising the undercarriage; and
   a door unhooking line and an undercarriage unhooking line;
   wherein the door unhooking line is connected to at least one undercarriage service line while the undercarriage unhooking line is connected to at least one door service line, and
   wherein the circuit also includes means for connecting the door service lines together during a door opening stage, and means for connecting the undercarriage service lines together during an undercarriage deployment stage.

2. A hydraulic circuit according to claim 1, wherein the means for connecting the door service lines together and the undercarriage service lines together are constituted by the selectors being configured so that when they are controlled for causing the undercarriage to deploy or the doors to open, they put both service lines into communication with each other.

3. A hydraulic circuit according to claim 1, including pilot valves controlling the undercarriage selector and fed with pressure by a line that is connected to the door opening line.

4. A hydraulic circuit according to claim 1, wherein each of the door unhooking line and the undercarriage unhooking line includes delay means for delaying actuation of the hooks.

5. A method of deploying an undercarriage using a hydraulic circuit comprising: a fluid feed line and a return line; at least one door selector connected to the feed and return lines, the selector feeding door service lines, including an opening line and a closing line for opening and closing the doors; at least one undercarriage selector connected to the feed and return lines, the selector feeding undercarriage service lines including a deployment line and a raising line for deploying and raising the undercarriage; and a door unhooking line and an undercarriage unhooking line, wherein the door unhooking line is connected to at least one undercarriage service line while the undercarriage unhooking line is connected to at least one door service line, and wherein the circuit also includes means for connecting the door service lines together during a door opening stage, and means for connecting the undercarriage service lines together during an undercarriage deployment stage,
   wherein the method comprises the steps of:
   a) controlling the door selector to confirm closure of the doors;

b) controlling the undercarriage selector to confirm raising of the undercarriage;
c) controlling the door selector to cause the doors to open until the doors are fully opened;
d) controlling the undercarriage selector to cause the undercarriage to deploy;
e) neutralizing the undercarriage selector;
f) controlling the door selector to cause the doors to close until the doors are hooked; and
g) neutralizing the door selector.

6. A method of raising an undercarriage using a hydraulic circuit comprising: a fluid feed line and a return line; at least one door selector connected to the feed and return lines, the selector feeding door service lines, including an opening line and a closing line for opening and closing the doors; at least one undercarriage selector connected to the feed and return lines, the selector feeding undercarriage service lines including a deployment line and a raising line for deploying and raising the undercarriage; and a door unhooking line and an undercarriage unhooking line, wherein the door unhooking line is connected to at least one undercarriage service line while the undercarriage unhooking line is connected to at least one door service line, and wherein the circuit also includes means for connecting the door service lines together during a door opening stage, and means for connecting the undercarriage service lines together during an undercarriage deployment stage, wherein the method comprises the steps of:
a) controlling the door selector to confirm closure of the doors;
b) controlling the undercarriage selector to confirm deployment of the undercarriage;
c) controlling the door selector to cause the doors to open;
d) controlling the undercarriage selector to cause the undercarriage to be raised until the undercarriage hooks;
e) neutralizing the undercarriage selector;
f) controlling the door selector to cause the doors to close until the doors are hooked; and
g) neutralizing the door selector.

* * * * *